F. V. ROESEL & C. H. FRANKS.
CORE FOR RESILIENT WHEEL TIRES.
APPLICATION FILED JAN. 13, 1913.
1,113,912.
Patented Oct. 13, 1914.
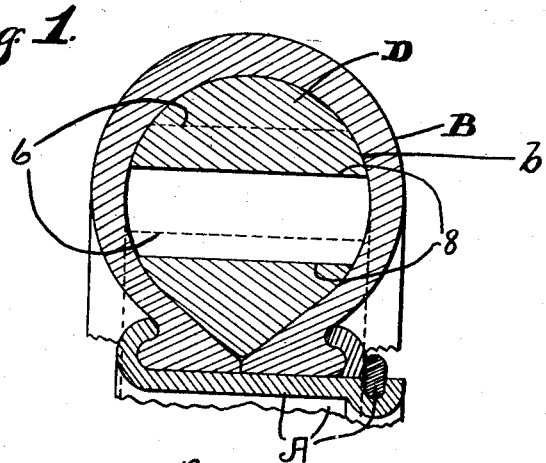
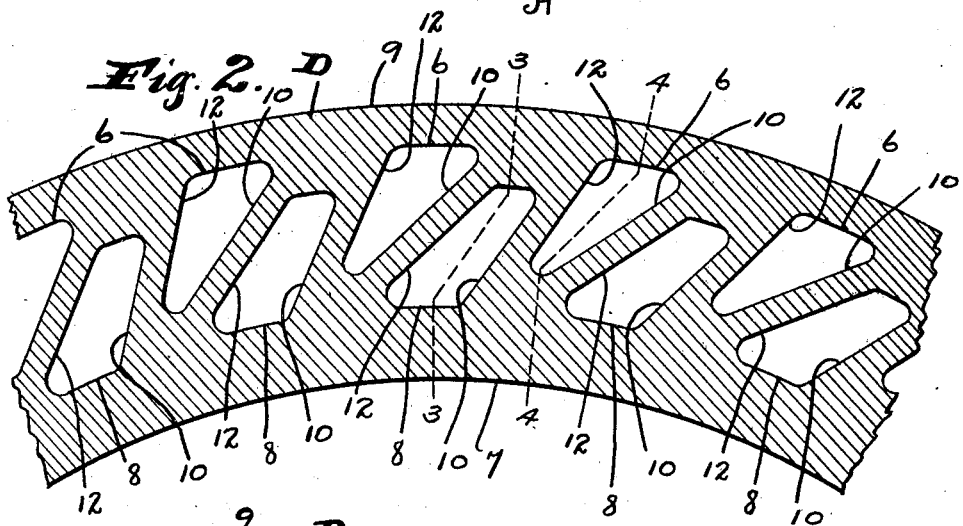
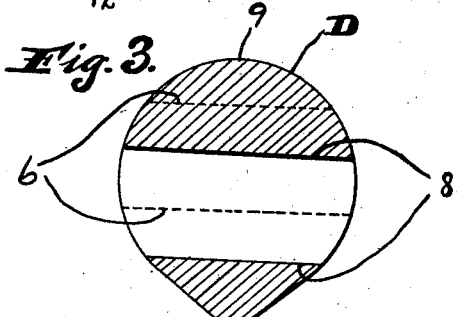
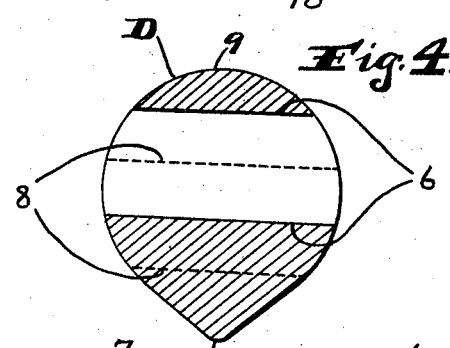
Witnesses:
H. J. Gittins
B. C. Brown.
Inventors
Frederick V. Roesel
and Charles H. Franks
By
their Attorneys

UNITED STATES PATENT OFFICE.

FREDERICK V. ROESEL AND CHARLES H. FRANKS, OF AKRON, OHIO.

CORE FOR RESILIENT WHEEL-TIRES.

1,113,912.

Specification of Letters Patent. Patented Oct. 13, 1914.

Application filed January 13, 1913. Serial No. 741,733.

*To all whom it may concern:*

Be it known that we, FREDERICK V. ROESEL and CHARLES H. FRANKS, citizens of the United States of America, residing at Akron, in the county of Summit, State of Ohio, have invented certain new and useful Improvements in Cores for Resilient Wheel-Tires; and we do hereby declare the following to be a full, clear, and exact description of the invention, such as will enable others skilled in the art to which it pertains to make and use the same.

This invention relates to improvements in cores for resilient wheel-tires, and pertains more especially to a flexible and elastic and compressible tire-core comprising a solid piece of elastic and compressible material, such, for instance, as rubber, which piece is so contoured as to render the core highly resilient more especially at the circumferential surfaces of the core, but strong enough to prevent the core from being unduly flabby.

In the accompanying drawings, Figure 1 is a cross-sectional view of a tire provided with a core embodying our invention and shows the tire applied to a tire-holder. Fig. 2 is a side view of a portion of the core in central section. Figs. 3 and 4 are transverse sections on line 3—3, and line 4—4, respectively, Fig. 2.

Referring to said drawings, A, Fig. 1, indicates a tire-holder which is, of course, made annular to render it capable of being mounted on a wheel-rim (not shown), and B represents a hollow casing of a tire, which casing is substantially the same as the casing of an ordinary pneumatic tire and consequently composed of flexible and elastic material such, for instance, as rubber. The casing B extends, of course, circumferentially of the tire-holder A and is provided interiorly with a chamber $b$ extending circumferentially of said tire-holder. Within said chamber is our improved flexible core D extending circumferentially of the tire-holder A, which core is separately illustrated in Figs. 2, 3 and 4 and comprises a solid piece or body of elastic and compressible material, such, for instance, as rubber. Said elastic and compressible core D is provided with two rows of holes, and said holes are spaced circumferentially of the core and extend from side to side of the core,—that is, transversely of and laterally through the core. The holes 6 in one of said rows of holes are spaced farther from the inner circumferential surface 7 of the core than the holes 8 in the other row of holes, and the last-mentioned holes are spaced farther from the outer circumferential surface 9 of the core than the holes 6. It will be observed therefore that our improved core is provided with an outer row of holes 6 and an inner row of holes 8 and that said holes 6 and 8 are not only spaced circumferentially of the core but arranged between and spaced from the outer and inner circumferential surfaces of the core. Each hole of each row of holes has sloping opposite side walls 10 and 12, and the wall 10 of said hole faces circumferentially of the core in one direction and toward the outer circumferential surface 9 of the core whereas the wall 12 of said hole faces circumferentially of the core in the opposite direction and toward the inner circumferential surface 7 of the core.

The holes 6 and 8 are shown in staggered relation. That is, the holes 6 alternate with the holes 8, and each hole 8 extends between two adjacent holes 6 preferably to a point between the central portions of the adjacent circumferentially facing side walls of the last-mentioned holes, and hence adjacent portions of adjacent holes 6 and 8 are arranged centrally between the inner and outer circumferential surfaces of the core. Opposite side walls 10 and 12 of each hole 6 preferably diverge toward the outer circumferential surface 9 of the core. Opposite side walls 10 and 12 of each hole 8 preferably diverge toward the inner circumferential surface 7 of the core. It will be observed therefore that each hole 6 is enlarged in dimensions circumferentially of the core toward the outer circumferential surface 9 of the core, and that each hole 8 is enlarged in dimensions circumferentially of the core toward the inner circumferential surface 7 of the core. Preferably said holes 6 and 8 are smaller in dimensions circumferentially of the core than in the direction extending between the outer and inner circumferential surfaces of the core. It will also be observed that each circumferentially facing wall of each hole in each row of holes extends substantially into the same plane radially of the core as the adjacent circumferentially facing wall of the adjacent hole in the other row of holes; that the holes of the outer row of holes are substantially triangular in cross-section as shown in Fig. 2; that the holes of the inner row of holes are trapezoidal in cross-section as shown in Fig. 2; that each circumferentially facing wall of each trapezoidal hole is substantially parallel with the adjacent circumferentially facing wall of the adjacent triangular hole; that said walls incline or slant in the same direction circumferentially of the core; that any archlike or brace-forming rib, partition or structure between each trapezoidal hole and the adjacent triangular holes is avoided, and that the maximum resiliency is attained without unduly impairing the strength of the core between each triangular hole and the inner circumferential surface of the core and between each trapezoidal hole and the outer circumferential surface of the core.

What we claim is:—

1. A flexible core for a resilient wheel-tire, which core comprises an elastic and compressible body having two rows of holes, the holes of each row of holes being spaced circumferentially and arranged transversely of the core and extending from side to side of the core and alternating with the holes in the other row of holes, each hole in each row of holes extending between the adjacent holes of the other row of holes, the circumferentially facing walls of all of said holes being inclined in the same direction circumferentially of the core, the holes of one row of holes being substantially triangular in cross-section, and the holes of the other row of holes being trapezoidal in cross-section.

2. A core for a resilient wheel-tire, which core comprises an elastic and compressible body having two rows of holes, the holes of each row of holes being spaced circumferentially and arranged transversely of the core and extending from side to side of the core and alternating with the holes of the other row of holes, the holes of the outer row of holes being substantially triangular in cross-section, the holes of the inner row of holes being trapezoidal in cross-section, each trapezoidal hole extending between the adjacent triangular holes, and the circumferentially facing walls of all of said holes being inclined in the same direction circumferentially of the core.

3. A flexible core for a resilient wheel-tire, which core comprises an elastic and compressible body having two rows of holes, the holes of each row of holes being spaced circumferentially and arranged transversely of the core and extending from side to side of the core and alternating with the holes in the other row of holes, each hole of each row of holes extending between the adjacent holes of the other row of holes, the holes of one row of holes being substantially triangular in cross-section, the holes of the other row of holes being trapezoidal in cross-section, each circumferentially facing wall of each trapezoidal hole being substantially parallel with the adjacent circumferentially facing wall of the adjacent triangular hole, and said walls being inclined in the same direction circumferentially of the core.

In testimony whereof we sign the foregoing specification in the presence of two witnesses.

FREDERICK V. ROESEL.
CHARLES H. FRANKS.

Witnesses:
B. C. BROWN,
N. L. McDONNELL.

Copies of this patent may be obtained for five cents each, by addressing the "Commissioner of Patents, Washington, D. C."